(12) United States Patent
Alex

(10) Patent No.: US 7,787,201 B2
(45) Date of Patent: Aug. 31, 2010

(54) METHOD AND APPARATUS FOR CONTROLLING FLY-HEIGHT OF A PERPENDICULAR-MAGNETIC-RECORDING HEAD IN A HARD DISK DRIVE

(75) Inventor: Michael Alex, Fremont, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 0 days.

(21) Appl. No.: 12/329,502

(22) Filed: Dec. 5, 2008

(65) Prior Publication Data

US 2010/0142073 A1 Jun. 10, 2010

(51) Int. Cl.
G11B 27/36 (2006.01)
G11B 21/02 (2006.01)

(52) U.S. Cl. .......................................... 360/31; 360/75
(58) Field of Classification Search ........................ None
See application file for complete search history.

(56) References Cited

U.S. PATENT DOCUMENTS

| | | | |
|---|---|---|---|
| 6,671,110 B2 | 12/2003 | Baba et al. | |
| 6,785,081 B2 | 8/2004 | Chapin et al. | |
| 6,801,376 B2 | 10/2004 | Smith | |
| 6,822,816 B2 | 11/2004 | Dakroub | |
| 6,930,844 B2 | 8/2005 | Yeh et al. | |
| 7,023,647 B2 | 4/2006 | Bloodworth et al. | |
| 7,068,458 B2 | 6/2006 | Huang et al. | |
| 7,126,777 B2 | 10/2006 | Flechsig et al. | |
| 7,154,696 B2 | 12/2006 | Nikitin et al. | |
| 7,180,692 B1 | 2/2007 | Che et al. | |
| 7,215,495 B1 | 5/2007 | Che et al. | |
| 7,239,471 B2 | 7/2007 | Tanabe | |
| 7,440,220 B1 * | 10/2008 | Kang et al. | 360/75 |
| 7,457,072 B2 * | 11/2008 | Dieron et al. | 360/75 |
| 7,583,462 B2 * | 9/2009 | Ohta et al. | 360/75 |
| 2003/0058559 A1 | 3/2003 | Brand et al. | |
| 2006/0023331 A1 | 2/2006 | Flechsig et al. | |
| 2006/0056094 A1 | 3/2006 | Fu et al. | |
| 2006/0092570 A1 | 5/2006 | Payne et al. | |
| 2006/0158768 A1 | 7/2006 | Tanabe | |
| 2006/0203376 A1 | 9/2006 | Yoshioka et al. | |
| 2006/0268445 A1 | 11/2006 | Brannon et al. | |

OTHER PUBLICATIONS

Talke, et al., "Surface Defect Studies of Flexible Media Using Magnetoresistive Sensors", *IEEE Transactions on Magnetics, vol. 11, Issue 5*, (Sep. 1975), 1188-1190.

* cited by examiner

*Primary Examiner*—K. Wong

(57) ABSTRACT

A method for controlling proximity of a read element of a perpendicular-magnetic-recording (PMR) head to a PMR disk. The method includes: a) writing recorded data with a write element of the PMR head to the PMR disk; b) providing a proximity-control setting to a proximity-control element; c) positioning the read element of the PMR head with the proximity-control element as determined by the proximity-control setting in communication with the PMR disk for reading recorded data back from the PMR disk; d) measuring a resolution of a read-back signal of recorded data on the PMR disk associated with the proximity-control setting; e) determining if the resolution measured for the read-back signal of recorded data on the PMR disk satisfies a criterion for the resolution of the read-back signal of recorded data; and, f) changing the proximity-control setting, and repeating b), c), d) and e), unless the resolution satisfies the criterion.

21 Claims, 9 Drawing Sheets

900

```
┌─────────────────────────────────────────────┐
│ READ THE RECORDED DATA FROM THE PMR DISK WITH│
│      A READ ELEMENT OF THE PMR HEAD          │
│                   910                        │
└─────────────────────────────────────────────┘
                      │
                      ▼
┌─────────────────────────────────────────────┐
│ PROVIDE A READ-BACK SIGNAL OF THE RECORDED   │
│ DATA RECORDED USING THE SQUARE-WAVE          │
│ WAVEFORM FROM THE READ ELEMENT               │
│                   920                        │
└─────────────────────────────────────────────┘
                      │
                      ▼
┌─────────────────────────────────────────────┐
│ MEASURE THE RESOLUTION OF THE READ-BACK      │
│ SIGNAL OF THE RECORDED DATA WRITTEN USING    │
│ THE SQUARE-WAVE WAVEFORM, WHEREIN THE        │
│ RESOLUTION IS DEFINED BY A TIME INTERVAL     │
│ SELECTED FROM THE GROUP CONSISTING OF A      │
│ RISE-TIME AT AN UP-STEP PORTION OF A         │
│ READ-BACK-SIGNAL, SQUARE-WAVE WAVEFORM       │
│ AND A FALL-TIME AT A DOWN-STEP PORTION OF A  │
│ READ-BACK-SIGNAL SQUARE-WAVE WAVEFORM        │
│ CORRESPONDING TO THE SQUARE-WAVE             │
│ WAVEFORM USED TO WRITE THE RECORDED DATA     │
│                   930                        │
└─────────────────────────────────────────────┘
```

FIG. 9

METHOD AND APPARATUS FOR CONTROLLING FLY-HEIGHT OF A PERPENDICULAR-MAGNETIC-RECORDING HEAD IN A HARD DISK DRIVE

TECHNICAL FIELD

Embodiments of the present invention relate generally to the field of magnetic-recording, hard-disk drives.

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for improved HDDs. Therefore, scientists at the frontiers of magnetic-recording technology are driven to improve methods of information retrieval and storage in HDDs. One such method is perpendicular-magnetic-recording (PMR).

However, PMR, as all innovative technological advances, is fraught with both pit falls and opportunities. The higher recording densities brought within reach by PMR has been accompanied by increased demands on the control of the scaled-down dimensional tolerances between the PMR head and the PMR disk, on which information is stored and from which information is retrieved. Thus, it is of paramount importance to effectively and reliably control the spacing between the PMR head and the PMR disk. Scientists engaged in the advance of PMR technology are focused on improving the control of this critical spacing between the PMR head and the PMR disk.

SUMMARY

Embodiments of the present invention include a method for controlling proximity of a read element of a perpendicular-magnetic-recording (PMR) head to a PMR disk. The method includes: a) writing recorded data with a write element of the PMR head to the PMR disk; b) providing a proximity-control setting to a proximity-control element; c) positioning the read element of the PMR head with the proximity-control element as determined by the proximity-control setting in communication with the PMR disk for reading recorded data back from the PMR disk; d) measuring a resolution of a read-back signal of recorded data on the PMR disk associated with the proximity-control setting; e) determining if the resolution measured for the read-back signal of recorded data on the PMR disk satisfies a criterion for the resolution of the read-back signal of recorded data; and, f) changing the proximity-control setting, and repeating b), c), d) and e), unless the resolution satisfies the criterion.

DESCRIPTION OF THE DRAWINGS

The accompanying drawings, which are incorporated in and form a part of this specification, illustrate embodiments of the invention and, together with the description, serve to explain the embodiments of the invention:

FIG. 9 is a flow chart illustrating a method for measuring a resolution, for example, T50, of the RBS of the recorded data on the PMR disk associated with the proximity-control setting, for example, the TFCS, in the method of FIG. 7, in an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention.

Figure 1:
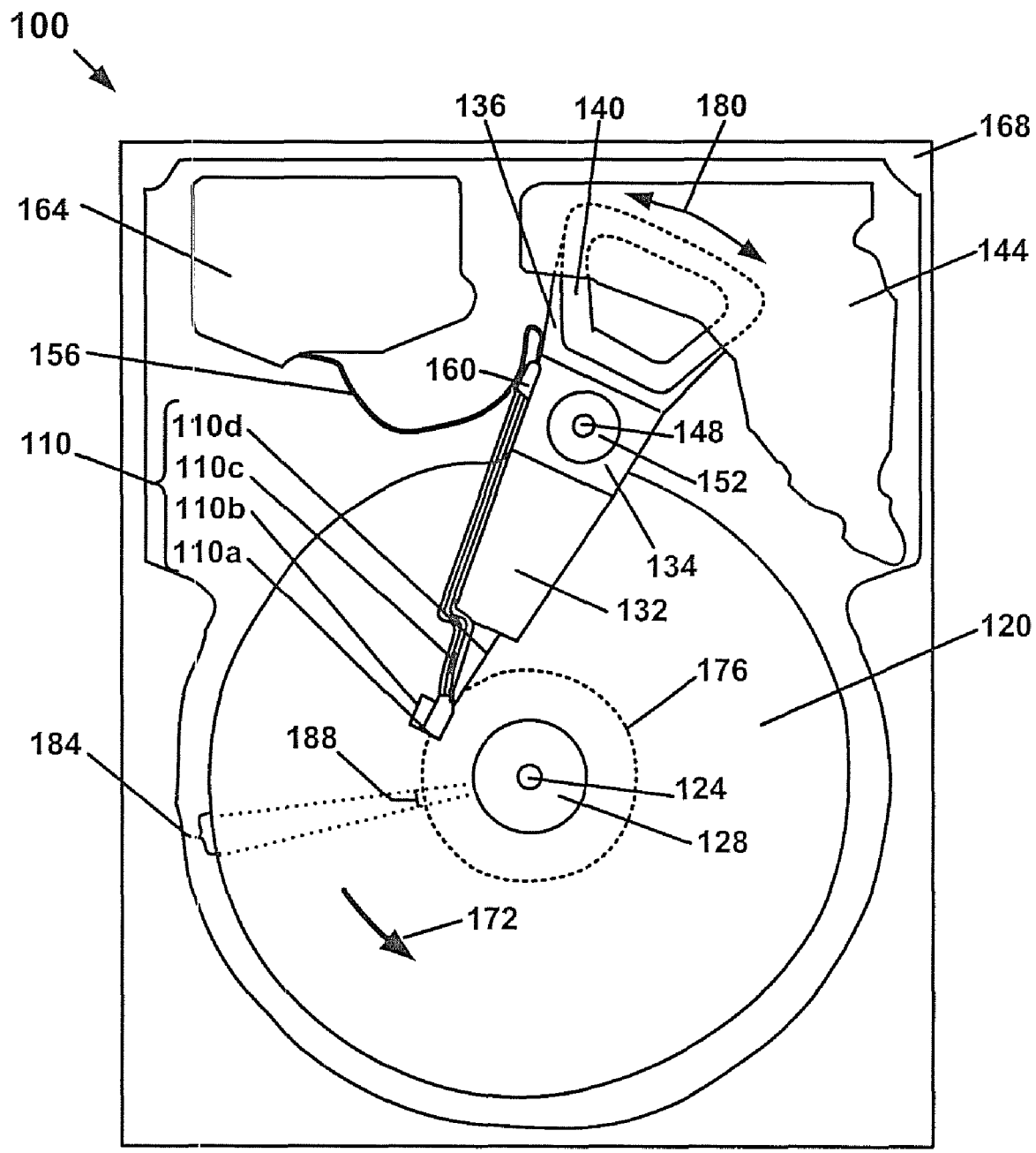
FIG. 1 is plan view of a hard-disk drive (HDD) drive that is configured to control a fly-height (FH) of a perpendicular-magnetic-recording (PMR) head in the HDD, and illustrates the functional arrangement of component parts in the HDD, in an embodiment of the present invention.

Physical Description of Embodiments of the Present Invention for an Apparatus for Controlling Fly-Height of a Perpendicular-Magnetic-Recording Head in a Hard-Disk Drive With reference to FIG. 1, in accordance with an embodiment of the present invention, a plan view of a hard-disk drive (HDD) 100 that is configured to control a fly-height (FH) of a perpendicular-magnetic-recording (PMR) head 110a in the HDD 100 is shown. FIG. 1 illustrates the functional arrangement of component parts in HDD 100. The HDD 100 includes at least one HGA 110 including a PMR head 110a, a lead suspension 110c attached to the PMR head 110a, and a load beam 110d attached to a slider 110b, which includes the PMR head 110a at a distal end of the slider 110b; the slider 110b is attached at the distal end of the load beam 110d to a gimbal portion of the load beam 110d. The HDD 100 also includes at least one PMR disk 120 rotatably mounted on a spindle 124 and a drive motor (not shown) attached to the spindle 124 for rotating the PMR disk 120. The PMR head 110a includes a write element, a so-called writer, a read element, a so-called reader, for respectively writing and reading information stored on the PMR disk 120 of the HDD 100, and a thermal-fly-height-control (TFC) element. The TFC element is configured to position the PMR head 110a in communication with the PMR disk 120 for writing recorded data to and reading recorded data from the PMR disk 120. By positioning the write element of PMR head 110a closer to the PMR disk 120, better writing performance is achieved; similarly, by positioning the read element of PMR head 110a closer to the PMR disk 120, better reading performance is also achieved. The PMR disk 120 or a plurality (not shown) of PMR disks may be affixed to the spindle 124 with a disk clamp 128. The HDD 100 further includes an arm 132 attached to the HGA 110, a voice-coil motor (VCM) that includes an armature 136 including a voice-coil 140 attached to the arm 132; and a stator 144 including a voice-coil magnet (not shown); the armature 136 of the VCM is attached to the arm 132 and is configured to move the arm 132 and the HGA 110 to access portions of the PMR disk 120 being mounted on a pivot 148 with an interposed pivot bearing 152.

With further reference to FIG. 1, in accordance with an embodiment of the present invention, electrical signals, for example, current to the voice-coil 140 of the VCM, write signal to and read-back signal from the PMR head 110a, are provided by a flexible cable 156. Interconnection between the flexible cable 156 and the PMR head 110a may be provided by an arm-electronics (AE) module 160, which may have an on-board pre-amplifier for the read-back signal, as well as other read-element-channel and write-element-channel electronic components. The flexible cable 156 is coupled to an electrical-connector block 164, which provides electrical communication through electrical feedthroughs (not shown) provided by an HDD housing 168. The HDD housing 168, also referred to as a casting, in conjunction with an HDD cover (not shown, as FIG. 1 shows the HDD 100 with the cover removed) provides an enclosure, which is sealed and protects the information storage components of the HDD 100.

With further reference to FIG. 1, in accordance with an embodiment of the present invention, other electronic components (not shown), including as a disk controller and servo-control electronics including a digital-signal processor (DSP), provide electrical signals to the drive motor, the voice-coil 140 of the VCM and the PMR head 110a of the HGA 110. The electrical signal provided to the drive motor enables the drive motor to spin providing a torque to the spindle 124 which is in turn transmitted to the PMR disk 120 that is affixed to the spindle 124 by the disk clamp 128; as a result, the PMR disk 120 spins in a direction 172. The spinning PMR disk 120 creates a cushion of air that acts as an air bearing on which the air-bearing surface (ABS) of the slider 110b rides so that the slider 110b flies above the surface of the PMR disk 120 without making contact with a thin PMR medium of the PMR disk 120 in which information is recorded. The electrical signal provided to the voice-coil 140 of the VCM enables the PMR head 110a of the HGA 110 to access a data track 176 on which information is recorded. Thus, the armature 136 of the VCM swings through an arc 180, which enables the HGA 110 attached to the armature 136 by the arm 132 to access various data tracks on the PMR disk 120. Information is stored on the PMR disk 120 in a plurality of concentric data tracks (not shown) arranged in sectors on the PMR-head-facing side of the PMR disk 120, for example, sector 184. Correspondingly, each data track is composed of a plurality of sectored data track portions, for example, sectored data track portion 188. Each sectored data track portion 188 is composed of recorded data and a header containing a servo-burst-signal pattern, for example, an ABCD-servo-burst-signal pattern, information that identifies the data track 176, and error correction code information. In accessing the data track 176, the read element of the PMR head 110a of the HGA 110 reads the servo-burst-signal pattern which provides information to the servo-control electronics, which controls the electrical signal provided to the voice-coil 140 of the VCM, enabling the PMR head 110a to follow the data track 176. Upon finding the data track 176 and identifying a particular sectored data track portion 188, the PMR head 110a either reads data back from the data track 176 or writes data to the data track 176 depending on instructions received by the disk controller from an external agent, for example, a microprocessor of a computer system.

With further reference to FIG. 1, in accordance with an embodiment of the present invention, a plan view of a head-arm-assembly (HAA) is shown. FIG. 1 illustrates the functional arrangement of the HAA with respect to VCM and HGA 110. The HAA includes the HGA 110 and the arm 132. The HAA is attached at the arm 132 to a carriage 134. In the case of an HDD having multiple disks, or platters as disks are sometimes referred to in the art, the carriage 134 is called an "E-block," or comb, because the carriage 134 is arranged to carry a ganged array of arms that gives it the appearance of a comb. As shown in FIG. 1, the armature 136 of the VCM is attached to the carriage 134 and the voice-coil 140 is attached to the armature 136. The AE module 160 may be attached to the carriage 134 as shown. The carriage 134 is mounted on the pivot 148 with the interposed pivot bearing 152, as previously described.

Figure 2:
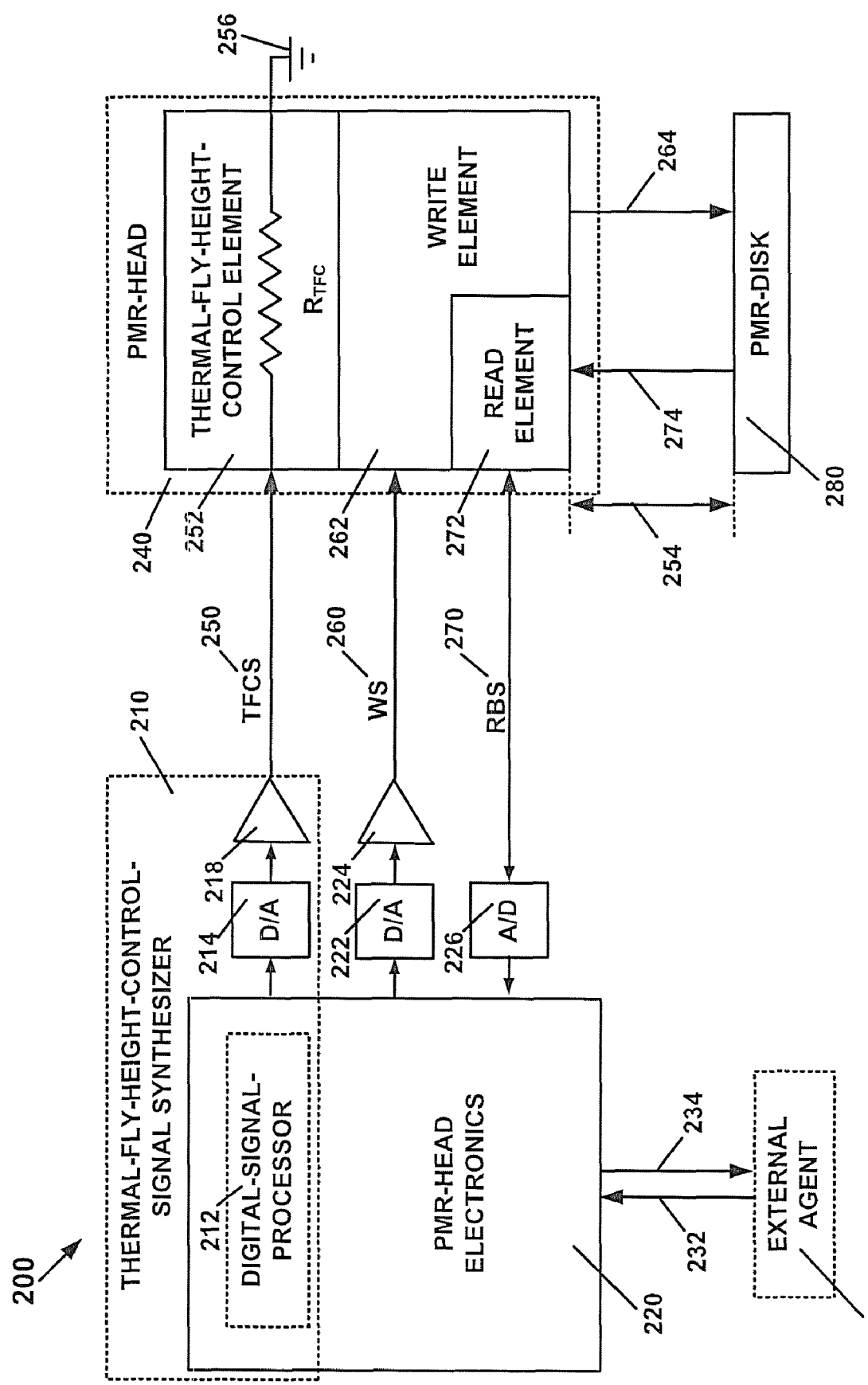
FIG. 2 is a schematic diagram of a FH-control system for control of the FH of the PMR head for reading a data track on a PMR disk, and illustrates a thermal-fly-height-control (TFC) circuit configured to control the FH of the PMR head in the HDD of FIG. 1, in an embodiment of the present invention.

With reference now to FIG. 2, in accordance with an embodiment of the present invention, a schematic diagram 200 of a FH-control system for control of the FH 254 of a PMR head 240 for reading a data track, for example, data track 176, on a PMR disk 280 is shown. FIG. 2 illustrates a TFC circuit, which functions as a proximity-control circuit for PMR head 240, identified with PMR head 110a of FIG. 1, configured to control the FH, identified with FH 254, of the PMR head 110a in the HDD 100. The TFC circuit is configured to control proximity of the read element 272, without limitation thereto, of the PMR head 240 to the PMR disk 280, identified with the PMR disk 120 of FIG. 1. The TFC circuit may also be configured to control proximity of the write element 262 of PMR head 240 to the PMR disk 280. The TFC circuit includes a thermal-fly-height-control-signal (TFCS) synthesizer 210 configured to generate TFCS 250, which may be identified with a proximity-control setting, associated with a resolution of a read-back signal (RBS) 270 having satisfied a criterion for the resolution of the RBS 270. The TFC circuit also includes the TFC element 252, which functions as the proximity-control element, electrically coupled to the TFCS synthesizer 210. TFC element 252 is configured to be driven with TFCS 250 to position the read element 272 of PMR head 240 in communication with the PMR disk 280 for reading 274 recorded data from the PMR disk 280. The TFCS synthesizer 210 also includes a DSP 212, which may be different from the DSP associated with control of the VCM discussed above, programmed to generate a digital signal for synthesizing TFCS 250, a digital-to-analog convertor (DAC) 214 electrically coupled to the DSP 212 wherein the DAC 214 converts the digital signal into an analog signal, and a TFC element driver 218 to amplify the analog signal to generate the TFCS 250.

With further reference to FIG. 2, in accordance with an embodiment of the present invention, the TFC element 252 may be a resistor, without limitation thereto, with resistance, $R_{TFC}$, which heats PMR head 240 in a portion of PMR head 240 adjacent to the write element 262 and the read element 272 through Joule heating in response to TFCS 250. As shown in FIG. 2, the resistor is shown as terminated in a connection to ground 256 for convenience of description, but need not be; in particular, the other end of the resistor, or other type of proximity-control element, may be connected to a second output terminal on the TFC element driver 218 in a push-pull configuration, in accordance with an embodiment of the present invention. The thermal expansion of the portion of PMR head 240 adjacent to the write element 262 and the read element 272 causes the write element 262 and/or the read element 272 of PMR head 240 to protrude in the direction of the PMR disk 280 altering the FH 254 between the write element 262 and/or the read element 272 and the PMR disk 280. In accordance with an embodiment of the present invention, feedback on the position of the read element 272 may be provided by resolution of the RBS 270 fed back through analog-to-digital convertor (ADC) 226 to PMR-head electronics 220, which may be used as a method of dynamically controlling the FH 254 in response to changing conditions impacting the air bearing on which the ABS of the slider 110b rides. Such conditions may be selected from the group, without limitation thereto, consisting of: a change in ambient operating temperature of the HDD 100, a change in ambient operating pressure of the HDD 100, increasing PMR-head drag associated with the build-up of lubricant or other debris on PMR head 240, and wear of the ABS of PMR head 240 causing recession of the ABS, as well as possible recession of the write element 262 or read element 272 of PMR head 240.

With further reference to FIG. 2, in accordance with an embodiment of the present invention, the PMR-head electronics 220 may include DSP 212, a microprocessor, one or more memories, a clock, timing circuits, read-element-channel electronics, write-element-channel electronics, and input and output drivers and buffers. A memory in the PMR-head electronics 220 may serve as a firmware module configured as a computer-readable storage medium having computer-executable instructions for performing the method for controlling proximity of the read element 272 of PMR head 240 to a PMR disk 280, in accordance with embodiments of the present invention. The firmware module may include any of a variety of non-volatile memory modules storing the computer-executable instructions in a computer-readable storage medium. Input instructions 232 including computer-executable instructions for performing the method for controlling proximity of the read element 272 of PMR head 240 to a PMR disk 280 may be input by external agent 230, which may include a HDD, a CD, a floppy disk, or other memory device storing the computer-executable instructions in a computer-readable storage medium, and stored in memory of the PMR-head electronics 220, which may include non-volatile memory, such as the firmware module described above, or in volatile memory modules such as random access memory (RAM). If the input instructions 232 including computer-executable instructions for performing the method for controlling proximity of the read element 272 of PMR head 240 to a PMR disk 280 of embodiments of the present invention are stored in a volatile memory, such storage is not to be construed as limiting embodiments of the present invention, because, if such storage in a volatile memory occurs, embodiments of the present invention will also include computer-executable instructions for performing the method of embodiments of the present invention stored in a tangible, computer-readable storage medium. The input instructions 232 may also include other instructions to the PMR-head electronics 220. In addition, the external agent 230 may receive output signals 234 from the PMR-head electronics 220, such as output signals 234 that may characterize the FH 254 of the read element 272, in particular, RBS 270.

Figure 3:
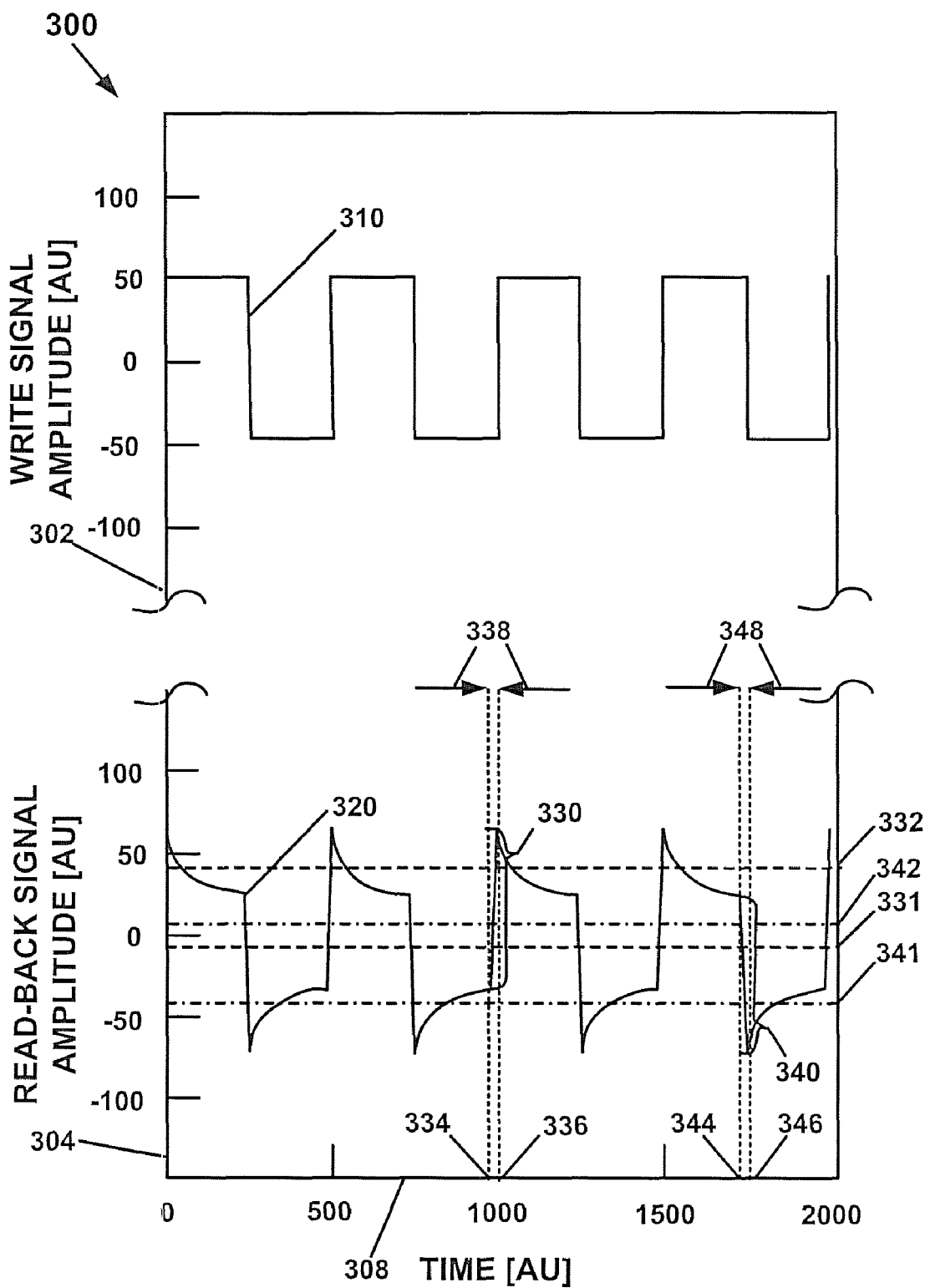
FIG. 3 is a plot of a write signal, for example, a square-wave waveform, used to write recorded data to the PMR disk and a read-back signal (RBS) used to measure resolution of a RBS of the recorded data on the PMR disk associated with a TFC signal (TFCS) provided to a TFC element used to control FH, which illustrates a definition of resolution, for example, T50, in an embodiment of the present invention.

With reference now to FIG. 3 and further reference to FIG. 2, in accordance with an embodiment of the present invention, the operation of the FH-control system shown in FIG. 2 is further described. The PMR disk 280, identified with PMR disk 120 of FIG. 1, is spun up. In response to load instructions, received as input instructions 232, the actuator loads an HGA, for example, HGA 110, onto the PMR disk 280 flying above the PMR disk 280 due to the action of the ABS, as previously described in FIG. 1. Input instructions 232 are sent to position PMR head 240 over a data track, for example, data track 176. The PMR-head electronics 220 produces a digital signal in response to the input instructions 232 for generating a write signal (WS) 260. The digital signal is sent to DAC 222 to convert the digital signal into an analog signal which is fed to write-element driver 224. Write-element driver 224 amplifies the analog signal to generate WS 260, which drives the write element 262. In conjunction with input instructions 232 for generating WS 260, preloaded input instructions 232 may position the write element 262 of PMR head 240 with TFC element 252 as determined by TFCS 250 in communication with the PMR disk 280 for writing 264 recorded data to the PMR disk 280. Write element 262 of PMR head 240 may then write 264 recorded data to the PMR disk 280. As shown in FIG. 3, writing 264 recorded data with write element 262 of PMR head 240 to the PMR disk 280 includes driving the write element 262 of PMR head 240 with a square-wave waveform 310 to write 264 recorded data to the PMR disk 280. The following are then performed:

1) TFCS 250, which is identified with a proximity-control setting for reading, is provided to TFC element 252, which functions as a proximity-control element;
2) the read element 272 of PMR head 240 is positioned, with the TFC element 252 as determined by TFCS 250, in communication with the PMR disk 280 for reading 274 recorded data back from the PMR disk 280;
3) a resolution of RBS 270 of the recorded data on the PMR disk 280 is measured that is associated with TFCS 250;
4) it is determined whether the resolution measured for the RBS 270 of the recorded data on the PMR disk 280 satisfies a criterion for the resolution of the RBS 270 of the recorded data; and
5) unless the resolution satisfies the criterion, TFCS 250 is changed and 1) through 4) are repeated.

With further reference to FIG. 2, in accordance with an embodiment of the present invention, 1) through 5) above may be programmed into the PMR-head electronics 220 in the form of computer-executable instructions for performing the method for controlling proximity of the read element 272 of PMR head 240 to a PMR disk 280 as described above. Moreover, if the resolution of the RBS 270 satisfies the criterion, the PMR-head electronics 220 may also perform the following: the TFCS 250 corresponding to the resolution that satisfies the criterion is provided to the TFC element 252; and, the read element 272 of the PMR head 240 is positioned, with the TFC element 252 as determined by the TFCS 250, in communication with the PMR disk 280 for reading other recorded data back from the PMR disk 280; similarly, the PMR-head electronics 220 may be programmed with computer-executable instructions for performing these tasks. As used herein the term "other recorded data" may be, without limitation thereto, any other recorded information on the PMR disk 280, such as may be recorded during normal, in-service operation of the HDD 100; but, it may also include subsequently written 264 recorded data for control of the FH 254, which may become necessary during the lifetime of the HDD 100 to compensate for changing conditions impacting the air bearing on which the ABS of the slider 110b rides, as described above. To facilitate in-service corrections to the FH 254, alternatively, 1) through 5) may be executed from on-board commands preloaded into the PMR-head electronics 220 with feed-back control as previously described; and, if the resolution of the RBS 270 satisfies the criterion, the PMR-head electronics 220 may be programmed to perform as previously described: the TFCS 250 corresponding to the resolution that satisfies the criterion is provided to the TFC element 252; and, the read element 272 of the PMR head 240 is positioned, with the TFC element 252 as determined by the TFCS 250, in communication with the PMR disk 280 for reading other recorded data back from the PMR disk 280. Alternatively, 1) through 5) may be executed from out-board commands supplied by external agent 230, such as a tester in a manufacturing line, in the form of input instructions 232; once the appropriate TFCS 250 corresponding to the resolution that satisfies the criterion is found from output signals 234 that characterize the FH 254 of the read element 272, in particular, RBS 270, input instructions 232 may be input to populate a look-up table resident in non-volatile memory as computer-executable instructions stored in a tangible, computer-readable storage medium for the operation of the HDD 100 in a pre-programmed mode without the dynamic feedback described above.

With reference once again to FIG. 3 and further reference to FIG. 2, in accordance with an embodiment of the present invention, a plot 300 of WS 260, for example, square-wave waveform 310, used to write 264 recorded data to the PMR disk 280 is shown. RBS 270, for example, RBS square-wave waveform 320, which is used to measure resolution of RBS 270 of the recorded data on the PMR disk 280 associated with TFCS 250, is also shown. TFCS 250 is provided to the TFC element 252 and used to control FH 254. FIG. 3 illustrates a definition of resolution, for example, T50 338, or alternatively T50 348, of RBS 270 of the recorded data on the PMR disk 280. To facilitate understanding the relationship between the recorded data written 264 to PMR disk 280 and the recorded data read 274 from PMR disk 280 upon which the definition of resolution is based, a dual ordinate plot with a common abscissa 308 is shown in FIG. 3. The first ordinate 302 of the plot 300 of a WS, for example, WS 260 identified with square-wave waveform 310, is given in arbitrary units (AU) of amplitude, for example, which may be on the order of tens of microvolts (μV×10). The second ordinate 304 of the plot 300 of a RBS, for example, RBS 270 identified with RBS square-wave waveform 320, is given in arbitrary units (AU) of amplitude, for example, which may be on the order of tens of microvolts (μV×10). Abscissa 308 of the plot 300 is given in arbitrary units (AU) of time, for example, which may be on the order of nanoseconds (ns). As shown in FIG. 3, the RBS square-wave waveform 320 may show some scalloping on a trailing side after the up-step portion 330 of the waveform and on a trailing side after the down-step portion 340 of the waveform, which distorts the idealized square-wave form of RBS square-wave waveform 320, but nevertheless does not unduly complicate the analysis; alternatively, the RBS square-wave waveform 320 may not exhibit such scalloping. Note that clipping electronics in the read-element-channel electronics can process the square-wave waveform 320 to appear like a standard square-wave waveform.

With further reference to FIGS. 2 and 3, in accordance with an embodiment of the present invention, the square-wave waveform 310 of WS 260 is shown in synchronization with the RBS square-wave waveform 320 of RBS 270 to emphasize the common frequency of both waveforms. However, the timing of the two signals will be entirely different, the square-wave waveform 310 of WS 260 being used to write 264 recorded data to the PMR disk 280 before the RBS square-wave waveform 320 of RBS 270 is used to read 274 the recorded data from PMR disk 280. RBS square-wave waveform 320 of RBS 270 may be viewed as the processed signal of the square-wave waveform 310 of WS 260 upon recovery from the PMR disk 280, after having passed through two transducers: the write element 262, and the read element 272 of the PMR head 240 by means of the PMR disk 280. In an embodiment of the present invention, the resolution of RBS 270 is defined by a time interval selected from the group consisting of a rise-time, without limitation thereto, at a up-step portion 330 of a RBS, square-wave waveform 320, for example, for T50 338, and a fall-time, without limitation thereto, at a down-step portion 340 of a RBS, square-wave waveform 320 such that the RBS, square-wave waveform 320 corresponds to the square-wave waveform 310 used to write 264 recorded data. The rise-time may be measured by the time it takes the up-step portion 330 of the RBS square-wave waveform 320 of RBS 270 to cross two threshold levels: a lower threshold level 331 and an upper threshold level 332. These threshold levels may be arbitrarily set; but, typically the threshold levels 331 and 332 are set symmetrically on either side of the mid amplitude of the peak-to-peak (p-t-p) value of the up-step portion 330 of the RBS square-wave waveform 320. For example, for T50 338, the thresholds for a T50 resolution are set at 75% of the maximum of the p-t-p value of the up-step portion 330 and 25% of the maximum of the p-t-p value of the up-step portion 330, the difference being 50%, which is the origin of the term of art "T50." For another example, T90 would correspond to thresholds at 95% of the maximum of the p-t-p value of the up-step portion 330 and 5% of the maximum of the p-t-p value of the up-step portion 330. The value of T50 338, indicated by a time interval between the double arrows in FIG. 3, is given by the difference between a first time value 334 of a first crossing of the up-step portion 330 of the RBS square-wave waveform 320 of the lower threshold level 331 and a second time value 336 of a second crossing of the up-step portion 330 of the RBS square-wave waveform 320 of the upper threshold level 332. Similarly, the fall-time may be measured by the time it takes the down-step portion 340 of the RBS square-wave waveform 320 of RBS 270 to cross two threshold levels: a lower threshold level 341 and an upper threshold level 342. These threshold levels may be arbitrarily set; but, typically the threshold levels 341 and 342 are set symmetrically on either side of the mid amplitude of the peak-to-peak (p-t-p) value of the down-step portion 340 of the RBS square-wave waveform 320. For example, for T50 348, the thresholds for a T50 resolution are set at 75% of the maximum of the p-t-p value of the down-step portion 340 and 25% of the maximum of the p-t-p value of the down-step portion 340, the difference being 50%. The value of T50 348, indicated by a time interval between the double arrows in FIG. 3, is given by the difference between a first time value 344 of a first crossing of the down-step portion 340 of the RBS square-wave waveform 320 of the upper threshold level 342 and a second time value 346 of a second crossing of the down-step portion 340 of the RBS square-wave waveform 320 of the lower threshold level 341.

Although T50 has been defined here in terms of the rise-time at an up-step portion 330 of a RBS, square-wave waveform 320, for example, for T50 338, and/or a fall-time at a down-step portion 340 of a RBS, square-wave waveform 320, for example, for T50 348, T50 might also be inferred from data patterns produced by waveforms other than the simple square-wave waveform discussed above. For example, another type of data pattern might be written, even a random data pattern, and, using signal post-processing of the RBS, T50 could be inferred even from this random data pattern. The definition of T50 given above is not to be construed as being so limited to just measurements made from square-wave waveforms, but also encompasses within the scope of the definition equivalent measurements of T50 inferred from other methods of ascertaining T50 that are within the spirit and scope of embodiments of the present invention, as T50 is a measure of PMR resolution which can be measured in a variety of ways that yield equivalent measurements of T50. Therefore, T50, as a measure of PMR resolution, may be defined as the rise-time from 25% to 75% of the isolated pulse peak amplitude and all equivalents thereof.

Thus, to measure a resolution, for example, T50 338, or alternatively T50 348, of RBS 270 of the recorded data on the PMR disk 280 associated with the TFCS 250, which may be identified with the proximity-control setting, the PMR-head electronics 220 may perform the following: read element 272 of the PMR head 240 may be used to read 274 recorded data from the PMR disk 280; RBS 270 may be provided from the read element 272 of the recorded data written 264 using the square-wave waveform 310; the resolution of RBS 270 of the recorded data written 264 using the square-wave waveform 310 may be measured using a definition of the resolution that is defined by a time interval selected from the group consisting of a rise-time, without limitation thereto, at a up-step portion of a RBS, square-wave waveform 320, for example, for T50 338, and a fall-time, without limitation thereto, at a down-step portion of a RBS, square-wave waveform 320, for example, for T50 348, such that the RBS, square-wave waveform 320 corresponds to the square-wave waveform 310 used to write 264 recorded data. In an embodiment of the present invention, the resolution is measured by T50 338, or alternatively by T50 348, without limitation thereto. The usefulness of measuring resolution in terms of T50 338 is that it is easily related to the classical measure of transition resolution used in longitudinal magnetic recording so-called "PW50." By taking the time derivative of the RBS square-wave waveform 320 of RBS 270, the RBS 270 can be transformed into a signal that looks like the analogous RBS of longitudinally recorded data. T50 338, or alternatively T50 348, can be measured in units of time; but, by multiplying by the linear velocity of the PMR disk 280 at the data track, for example, data track 176, which is determined by the rotational speed of the PMR disk 280 in revolutions-per-minute (rpm) and the radius at which a data track, for example, data track 176, is recorded, by the T50 338 as measured in units of time, T50 338 may be expressed in units of length. Expressing T50 338, or alternatively T50 348, in units of length is useful in relating T50 to the maximum areal density of information recorded on the PMR disk 280 per the design specifications of the HDD 100. A T50 on the order of the bit cell size is optimal for achieving the targeted areal density of the design specification. In an embodiment of the present invention, the criterion that the resolution satisfies is that T50 338, or alternatively T50 348, is less than or equal to 28 nanometers (nm).

With further reference to FIGS. 2 and 3, in accordance with an embodiment of the present invention, it is desirable to write 264 recorded data to the PMR disk 280 such that the dimension of a bit-cell determined by the areal density design matches the resolution as measured by T50 338. The dimension of a bit-cell in turn is related to the period, $\tau$, between clock pulses of the clock in that it determines the timing for writing 264 recorded data to the PMR disk 280. Ideally, a ratio of T50/$\tau$ between about 0.8 and about 1.2 gives good resolution performance. Here, for sake of clarity both T50 338 and $\tau$ having units in the time domain. In general, by reducing T50 338, for example, by reducing FH 254, the resolution performance can be improved. In an embodiment of the present invention, to measure T50 338, or alternatively T50 348, a low-frequency, square-wave waveform is chosen for the square-wave waveform 310. As used herein, a low frequency is defined such that the period of the low frequency, square-wave waveform is greater than or equal to about 10 times the period, $\tau$, between clock pulses of the clock, or 10 $\tau$. This corresponds to a square-wave waveform with a length in the spatial domain of about 10 bit cells. As used herein, a high frequency is defined such that the period of the high frequency, square-wave waveform is less than or equal to about 2 times the period, $\tau$, between clock pulses of the clock, or 2 $\tau$.

Figure 4:
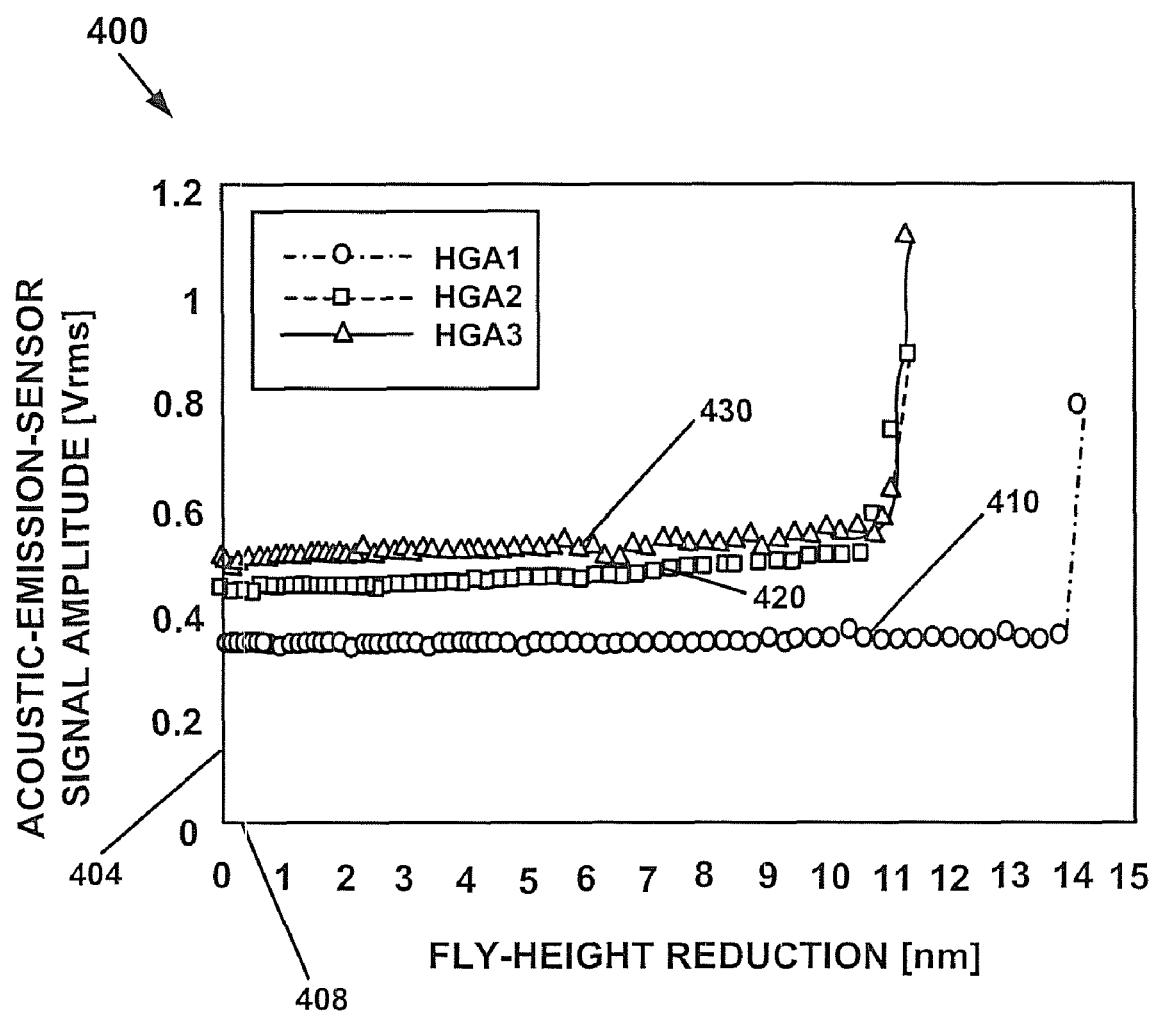
FIG. 4 is a plot of acoustic emission sensor (AES) amplitude in establishing FH of PMR heads of several head-gimbal assemblies (HGAs) by a "touch-down" procedure.

With reference now to FIG. 4, a plot 400 of acoustic emission sensor (AES) signal amplitude in establishing FH of PMR heads of several HGAs by a "touch-down" procedure is shown. FIG. 4 demonstrates one method of establishing the FH, similar to FH 254, which is to apply a TFCS, similar to TFCS 250, until the read element, for example, read element 272, makes contact with the PMR disk, for example, PMR disk 280. In a typical manufacturing implementation of the "touch-down" procedure, a change, such as a modulation of the RBS, distortion in the RBS or error rate degradation in the RBS, from the read element is used to determine when contact with the PMR disk has occurred. However, for the data shown in FIG. 4, which was obtained on a spin-stand, the amplitude of a signal from an acoustic emission sensor (AES) mounted in proximity to the PMR head is observed, which shows when contact with the PMR disk occurs. This "touch-down" procedure then provides a reference datum in the TFCS from which the position of the read element can be calibrated for reading recorded data from the PMR disk during in-service operation of the HDD. There are many problems associated with this "touch-down" procedure; but, most, if not all, of the problems derive from the fact that the PMR head must make contact with the PMR disk in order to establish the reference datum for the TFCS. The concomitant problems associated with a PMR head contacting a PMR disk are, to name a few: damage to the protective overcoat layers of the PMR head and the PMR disk; subsequent in-service, accelerated corrosion and wear of the PMR head and the PMR disk due to damage to the protective overcoat layers; potential alteration of the response of the read element to magnetic flux from the PMR disk in reading recorded data and of the write element in generating the magnetic flux in writing recorded data to the PMR disk due to dead-layers created by work hardening of the magnetic layers in the read element and write element upon contacting the PMR disk; and, the initiation of wear of both the PMR head and the PMR disk. In accordance with an embodiment of the present invention, these problems are substantially mitigated by the method for controlling proximity of the read element 272 of PMR head 240 to PMR disk 280 that includes a method for controlling proximity of the read element 272 of PMR head 240 to PMR disk 280 without contacting the PMR disk 280 with the PMR head 240. Moreover, in accordance with embodiments of the present invention, the method for controlling proximity of the read element 272 of PMR head 240 to PMR disk 280 without contacting the PMR disk 280 with the PMR head 240 was developed in contrast with the "touch-down" procedure, which teaches away from embodiments of the present invention.

With further reference to FIG. 4, to overcome the problems associated with the "touch-down" procedure, experiments were performed to prove the feasibility of the method for controlling proximity of the read element 272 of PMR head 240 to PMR disk 280 without contacting the PMR disk 280 with the PMR head 240, in accordance with embodiments of the present invention. Three HGAs: HGA1, HGA2 and HGA3, with suspended PMR heads were tested on a spin-stand. FIG. 4 shows the results of the test. Ordinate 404 of the plot 400 of the AES signals of each PMR head suspended on each of the HGAs is given in units of root-mean-square volts ($V_{rms}$) of AES signal amplitude. Abscissa 408 of the plot 400 is given in units of nanometers (nm) of FH reduction. AES signal 410 shows the response of the AES for the PMR head suspended on HGA1 to progressive lowering towards the PMR disk on the spin-stand, as occurs when TFCS is applied to the PMR head in an attempt to find the reference datum for the TFCS. Similarly, AES signal 420 shows the response of the AES for the PMR head suspended on HGA2 to progressive lowering towards the PMR disk on the spin-stand, as occurs when TFCS is applied to the PMR head in an attempt to find the reference datum for the TFCS; and, AES signal 430 shows the response of the AES for the PMR head suspended on HGA3 to progressive lowering towards the PMR disk on the spin-stand, as occurs when TFCS is applied to the PMR head in an attempt to find the reference datum for the TFCS. As indicated by the sudden rise in the AES signal for the PMR head of HGA1, the PMR head of HGA1 shows the onset of head-disk interaction (HDI) at about 14 nm of FH reduction. Similarly, the PMR head of HGA2 shows the onset of HDI at about 11 nm of FH reduction; and, the PMR head of HGA3 also shows the onset of HDI at about 11 nm of FH reduction. FIG. 4 shows that there can be a wide variation in FH from PMR head to PMR head. In every case, the reference datum for FH is established through HDI, an event with deleterious consequences for the PMR head and the PMR disk for the reasons stated above.

Figure 5:
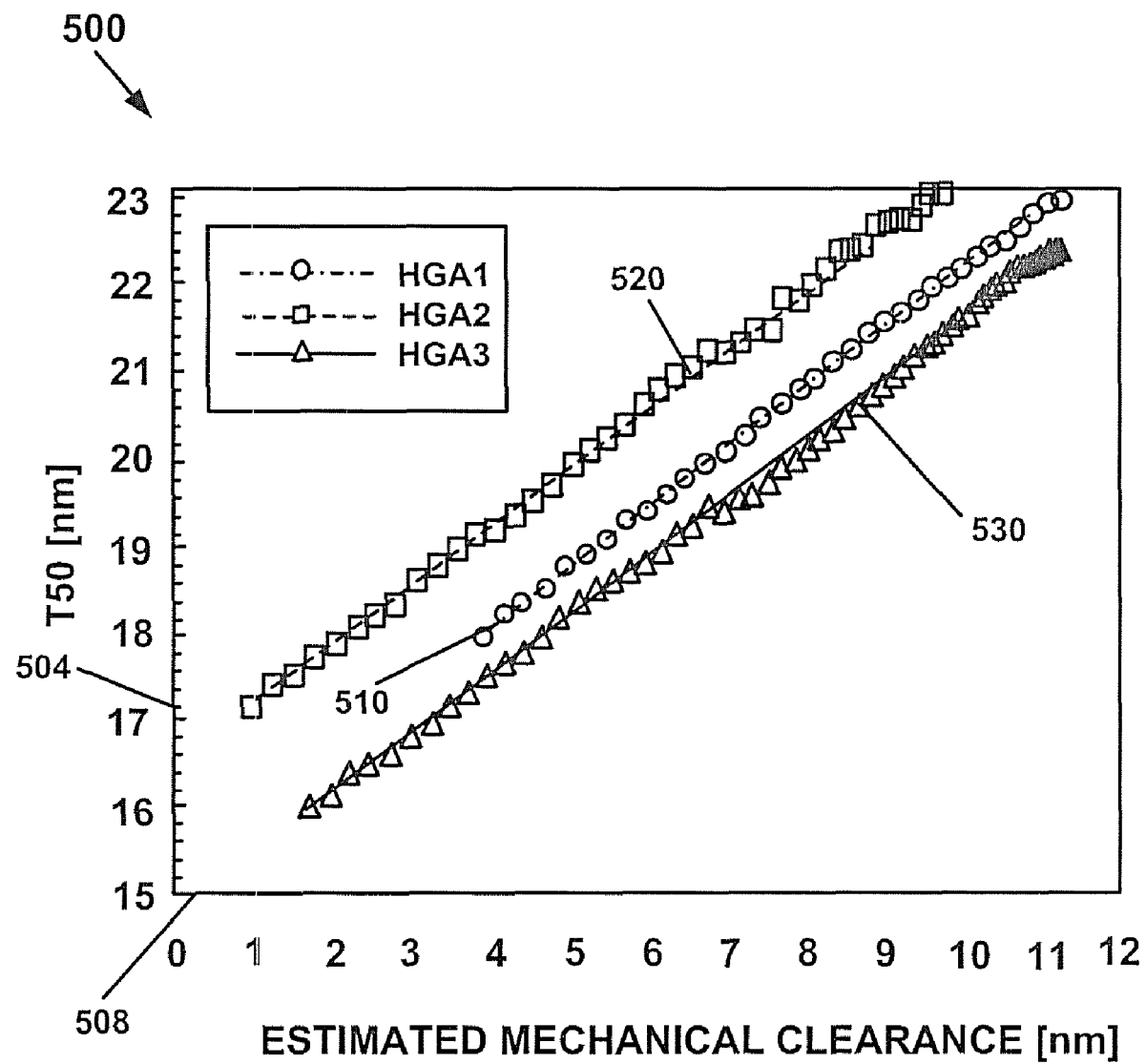
FIG. 5 is a plot of T50 versus estimated mechanical clearance of the read elements of PMR heads from the several HGAs characterized by the "touch-down" procedure of FIG. 4.

With reference now to FIG. 5, a plot 500 of T50 versus estimated mechanical clearance of the read elements of PMR heads from the several HGAs characterized by the "touch-down" procedure of FIG. 4 is shown. Ordinate 504 of the plot 500 of the T50s of each PMR head suspended on each of the HGAs is given in units of nanometers (nm) of resolution. Abscissa 508 of the plot 500 is given in nanometers (nm) of estimated mechanical clearance. The resolution of each of the read elements of each of the PMR heads suspended on the HGAs: HGA1, HGA2 and HGA3, of FIG. 4 was then measured using the T50 metric for resolution, described above, as a function of estimated mechanical clearance. Resolution plot 510 shows the resolution response of the read element of the PMR head of HGA1 to progressive lowering towards the PMR disk on the spin-stand. Similarly, resolution plot 520 shows the resolution response of the read element of the PMR head of HGA2 to progressive lowering towards the PMR disk on the spin-stand; and, resolution plot 530 shows the resolution response of the read element of the PMR head of HGA3 to progressive lowering towards the PMR disk on the spin-stand. Note that for a constant mechanical clearance, as would be set based on a mechanical clearance specification per the "touch-down" procedure, each of the three read elements has widely different resolution, which is indicated by the vertical separation of each of the resolution plots 510, 520 and 530 for a given value of the estimated mechanical clearance. Thus, using the constant mechanical clearance based on a mechanical clearance specification per the "touch-down" procedure is highly wasteful of the resolution "budget" for the HDD design, which would lead to widely varying performance for HDDs built with HGAs incorporating these PMR-head read elements, as well as waste of the areal density "budget" for storing information on the PMR disk. Moreover, the "touch-down" procedure requires additional information about the gain, the sensitivity of the TFC element to an applied TFCS, of each individual PMR head, which can vary from PMR head to PMR head, in the HDD build process. If some value for gain is assumed, rather than ascertained, for each individual head during the HDD build process, the "touch-down" procedure introduces another source of uncertainty in positioning the PMR head over the PMR disk. If the gain is ascertained by measurement of each individual head during the HDD build process, the "touch-down" procedure introduces another source of cost in the HDD build process. In contrast, embodiments of the present invention, which are next described, avoid both a determination of the absolute spacing between the read element 272 of the PMR head 240 and the PMR disk 280, as well as perilous assumptions about the gain of the TFC element 252, or costly measurement procedures in the HDD build process to determine the gain of the TFC element 252.

Figure 6:
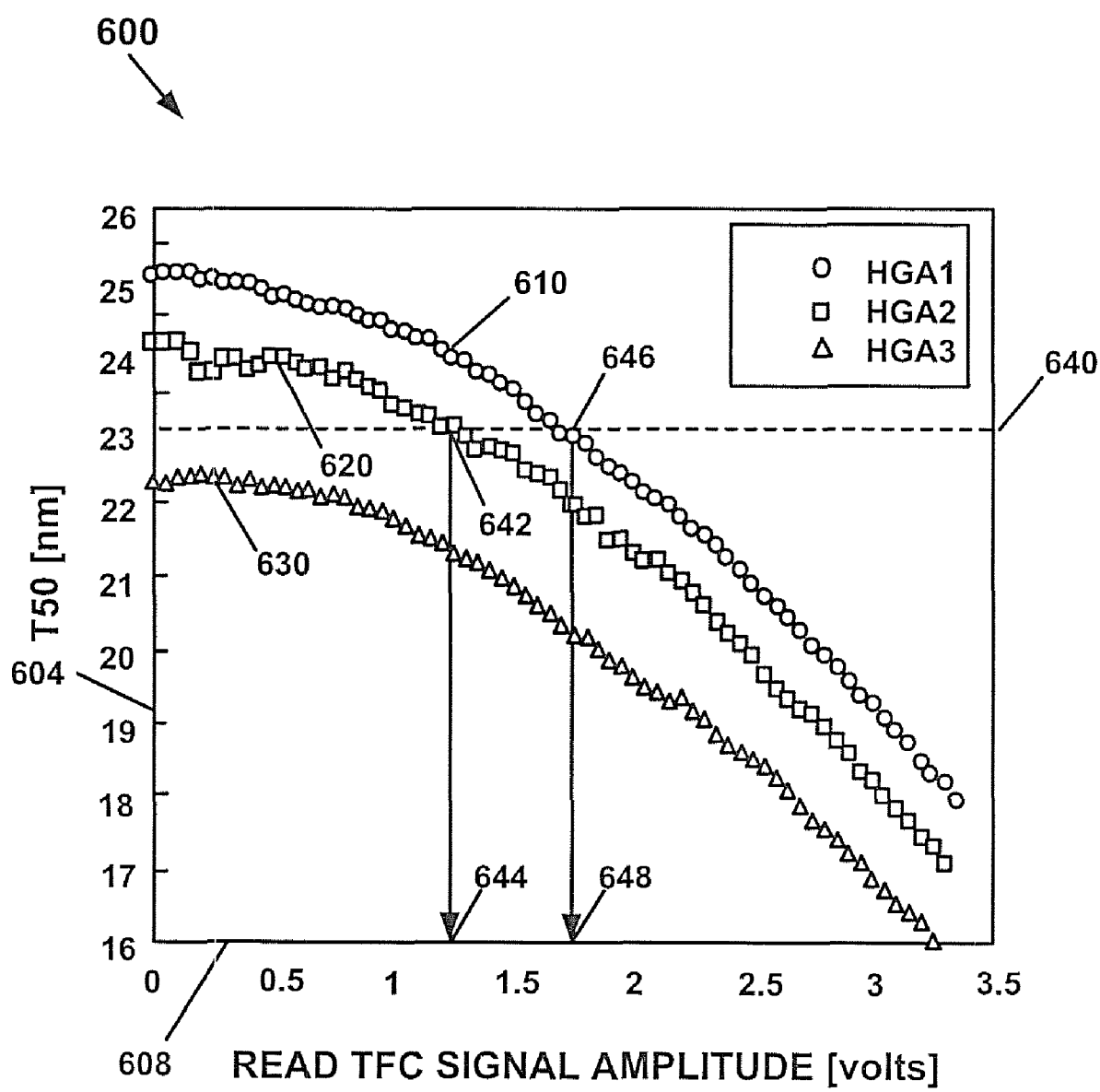
FIG. 6 is a plot of T50 versus read TFCS of the read elements of the PMR heads from the several HGAs of FIG. 4 that illustrates an example method for controlling the FH of the read element of the PMR head over the PMR disk, in an embodiment of the present invention.

With reference now to FIG. 6, in accordance with embodiments of the present invention, a plot 600 of T50 versus read TFCS of the read elements of the PMR heads from the several head-gimbal assemblies: HGA1, HGA2 and HGA3, of FIG. 4 is shown. FIG. 6 illustrates an example method for controlling the FH 254 of the read element 272 of the PMR head 240 over the PMR disk 280. Ordinate 604 of the plot 600 of the T50s of each PMR head suspended on each of the HGAs is given in units of nanometers (nm) of resolution. Abscissa 608 of the plot 600 is given in units of volts (V) of read TFCS amplitude. Resolution plot 610 shows the resolution response of the read element of the PMR head of HGA1 to progressive lowering towards the PMR disk on the spin-stand for various values of applied TFCS. Similarly, resolution plot 620 shows the resolution response of the read element of the PMR head of HGA2 to progressive lowering towards the PMR disk on the spin-stand for various values of applied TFCS; and, resolution plot 630 shows the resolution response of the read element of the PMR head of HGA3 to progressive lowering towards the PMR disk on the spin-stand for various values of applied TFCS. Rather than relying on a constant FH specification, a constant resolution specification is used to establish the appropriate reference datum for the TFCS, in accordance with embodiments of the present invention. For a resolution criterion of T50 less than or equal to 23 nm, indicated by the ordinate value for line 640, the read element of the PMR head of HGA1 achieves this level of resolution at the crossing of the line 640 as indicated by the arrow at a TFCS value 648 of about 1.7 volts. Although a criterion of T50 less than or equal to 23 nm is shown in FIG. 6, a criterion of T50 less than or equal to 28 nm currently provides acceptable performance for many HDD designs. Similarly, the read element of the PMR head of HGA2 achieves this level of resolution at the crossing of the line 640 as indicated by the arrow at a TFCS value 644 of about 1.2 volts. The read element of the PMR head of HGA3 exceeds this level of resolution, which means the read element has a lower value of T50, as indicated by all values of the resolution plot 630 lying below the line 640, in which case TFC is not required for good RBS performance of the read element of the PMR head of HGA3. Therefore, the method for controlling proximity of the read element 272 of PMR head 240 to PMR disk 280, for example, by controlling FH 254 of read element 272 of PMR head 240 over PMR disk 280, would result in improved utilization of the areal density "budget" for HDD 100, improved cost efficiency in manufacturing HDD 100, and elimination of the deleterious effects that would attend the use of the "touch-down" procedure, if the "touch-down" procedure had been used to set FH 254 of read element 272 of PMR head 240 in HDD 100.

Figure 7:
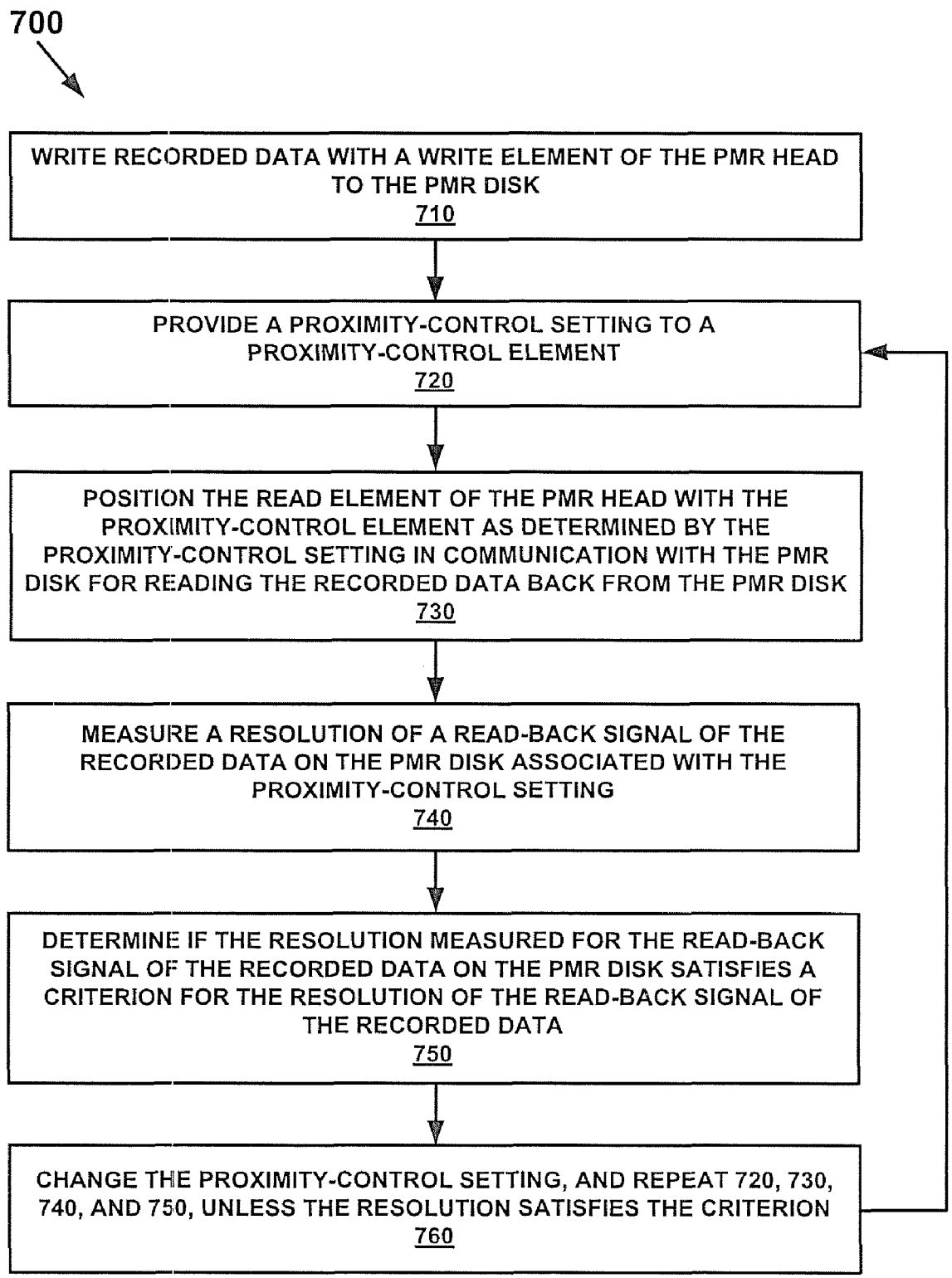
FIG. 7 is a flow chart illustrating a method for controlling proximity, for example, FH, of the read element of the PMR head to the PMR disk in the HDD, in an embodiment of the present invention.

Description of Embodiments of the Present Invention for a Method for Controlling Fly-Height of a PMR Head in a Hard-Disk Drive With reference now to FIG. 7, in accordance with an embodiment of the present invention, a flow chart 700 illustrates the method for controlling proximity, for example, FH, of the read element of a PMR head to a PMR disk in a HDD. At 710, the write element of the PMR head writes recorded data to the PMR disk. The write element of the PMR head in writing recorded data to the PMR disk may be driven with a square-wave waveform to write the recorded data to the PMR disk; and, the square-wave waveform may be a low-frequency, square-wave waveform, as previously described. At 720, the proximity-control setting is provided to the proximity-control element. At 730, the read element of the PMR head is positioned, with the proximity-control element as determined by the proximity-control setting, in communication with the PMR disk for reading the recorded data back from the PMR disk. At 740, a resolution of the RBS of the recorded data on the PMR disk is measured that is associated with the proximity-control setting. At 750, it is determined whether the resolution measured for the RBS of the recorded data on the PMR disk satisfies the criterion for the resolution of the RBS of the recorded data. At 760, unless the resolution satisfies the criterion, the proximity-control setting is changed and 720, 730, 740 and 750 are repeated. For the method for controlling proximity of the read element of the PMR head to the PMR disk in the HDD of FIG. 7, the proximity-control element may be a TFC element; the proximity-control setting may be a TFCS provided to the TFC element; the resolution may be measured by T50; and, the criterion may be that T50 may be less than or equal to 28 nanometers. In accordance with an embodiment of the present invention, the method for controlling proximity, for example, FH, of the read element of the PMR head to the PMR disk in the HDD may be a method for controlling proximity of a read element of a PMR head to a PMR disk without contacting the PMR disk.

Figure 8:
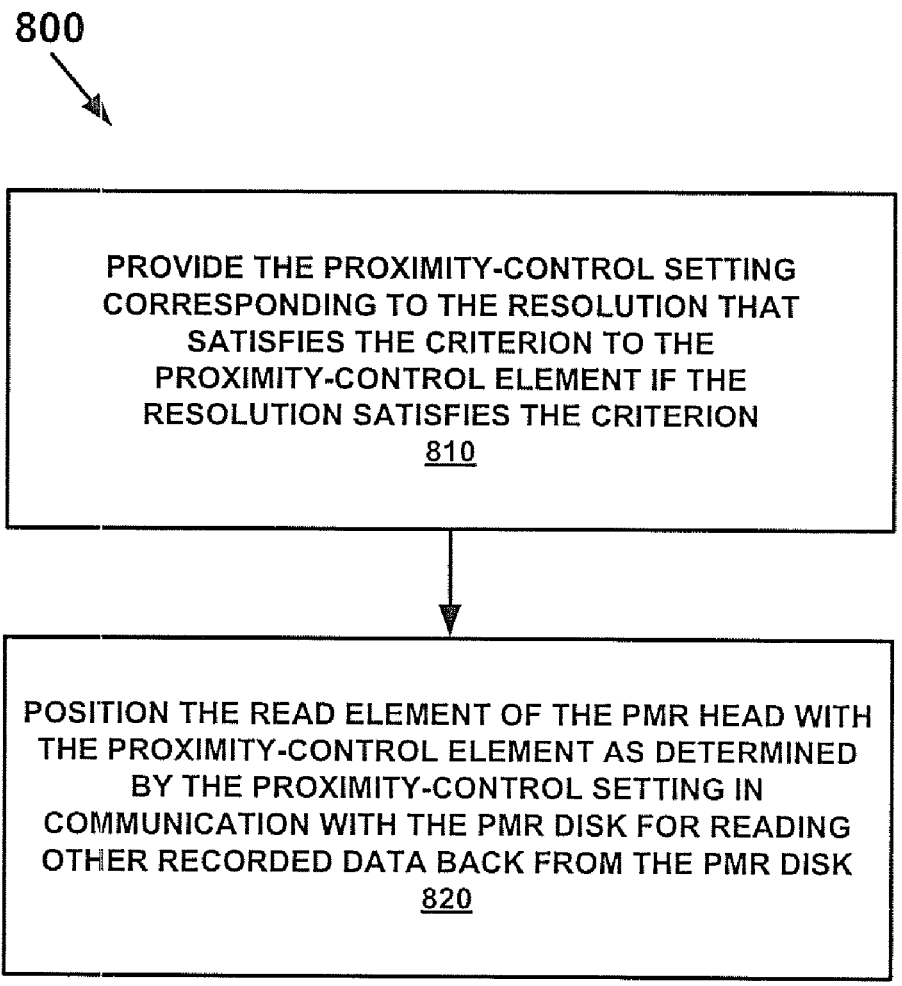
FIG. 8 is a flow chart illustrating further embodiments of the present invention for controlling proximity, for example, FH, of the read element of the PMR head to the PMR disk in the HDD of the method of FIG. 7, in an embodiment of the present invention.

With reference now to FIG. 8, in accordance with an embodiment of the present invention, a flow chart 800 illustrates further embodiments of the present invention for controlling proximity, for example, FH, of the read element of the PMR head to the PMR disk in the HDD of the method of FIG. 7. At 810, if the resolution satisfies the criterion, the proximity-control setting corresponding to the resolution that satisfies the criterion is provided to the proximity-control element. At 820, the read element of the PMR head is positioned, with the proximity-control element as determined by the proximity-control setting, in communication with the PMR disk for reading other recorded data back from the PMR disk. Also, for further embodiments of the present invention for the method for controlling proximity of the read element of the PMR head to the PMR disk in the HDD of FIG. 8, the proximity-control element may be a TFC element; the proximity-control setting may be a TFCS provided to the TFC element; the resolution may be measured by T50; and, the criterion may be that T50 may be less than or equal to 28 nanometers.

With reference to FIG. 9, in accordance with an embodiment of the present invention, a flow chart 900 illustrates a method for measuring the resolution, for example, T50, of the RBS of the recorded data on the PMR disk associated with the proximity-control setting, for example, TFCS, in the method of FIG. 7. At 910, the read element of the PMR head reads recorded data from the PMR disk. At 920, the RBS is provided from the read element of the recorded data written using the square-wave waveform. At 930, the resolution, for example, T50, of the RBS of the recorded data written using the square-wave waveform is measured using the definition of the resolution that is defined by a time interval selected from the group consisting of a rise-time, without limitation thereto, at a Lip-step portion of a RBS, square-wave waveform and a fall-time, without limitation thereto, at a down-step portion of a RBS, square-wave waveform such that the RBS, square-wave waveform corresponds to the square-wave waveform used to write recorded data. The square-wave waveform used to write recorded data may be a low-frequency, square-wave waveform, as previously described.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It may be intended that the scope of the invention be defined by the claims appended hereto and their equivalents.

What is claimed is:

1. A method for controlling proximity of a read element of a perpendicular-magnetic-recording head to a perpendicular-magnetic-recording disk, said method comprising:
   a) writing recorded data with a write element of said perpendicular-magnetic-recording head to said perpendicular-magnetic-recording disk;
   b) providing a proximity-control setting to a proximity-control element;
   c) positioning said read element of said perpendicular-magnetic-recording head with said proximity-control element as determined by said proximity-control setting in communication with said perpendicular-magnetic-recording disk for reading said recorded data back from said perpendicular-magnetic-recording disk;
   d) measuring a resolution of a read-back signal of said recorded data on said perpendicular-magnetic-recording disk associated with said proximity-control setting;
   e) determining if said resolution measured for said read-back signal of said recorded data on said perpendicular-magnetic-recording disk satisfies a criterion for said resolution of said read-back signal of said recorded data, wherein said resolution is measured by T50 obtained from said read-back signal of said recorded data written with a low-frequency, square-wave waveform; and
   f) changing said proximity-control setting, and repeating b), c), d) and e), unless said resolution satisfies said criterion, wherein proximity of said read element is controlled by said resolution of said read-back signal of said recorded data.

2. The method recited in claim 1, wherein said method further comprises:
  providing said proximity-control setting corresponding to said resolution that satisfies said criterion to said proximity-control element if said resolution satisfies said criterion;
  positioning said read element of said perpendicular-magnetic-recording head with said proximity-control element as determined by said proximity-control setting in communication with said perpendicular-magnetic-recording disk for reading other recorded data back from said perpendicular-magnetic-recording disk.

3. The method recited in claim 2, wherein said proximity-control element is a thermal-fly-height-control element.

4. The method recited in claim 3, wherein proximity-control setting is a thermal-fly-height-control signal provided to said thermal-fly-height-control element.

5. The method recited in claim 1, wherein said criterion is that T50 is less than or equal to 28 nanometers.

6. The method recited in claim 1, wherein said writing recorded data with a write element of said perpendicular-magnetic-recording head to said perpendicular-magnetic-recording disk further comprises:
  driving said write element of said perpendicular-magnetic-recording head with a square-wave waveform to write said recorded data to said perpendicular-magnetic-recording disk.

7. The method recited in claim 6, wherein said measuring a resolution of a read-back signal of said recorded data on said perpendicular-magnetic-recording disk associated with said proximity-control setting further comprises:
  reading said recorded data from said perpendicular-magnetic-recording disk with a read element of said perpendicular-magnetic-recording head;
  providing a read-back signal of said recorded data written using said square-wave waveform from said read element;
  measuring said resolution of said read-back signal of said recorded data written using said square-wave waveform, wherein said resolution is defined by a time interval selected from the group consisting of a rise-time at an up-step portion of a read-back-signal, square-wave waveform and a fall-time at a down-step portion of a read-back-signal, square-wave waveform, said read-back-signal, square-wave waveform corresponding to said square-wave waveform used to write said recorded data.

8. The method recited in claim 7, wherein said square-wave waveform is a low-frequency, square-wave waveform.

9. The method recited in claim 1, wherein said proximity-control element is a thermal-fly-height-control element.

10. The method recited in claim 9, wherein proximity-control setting is a thermal-fly-height-control signal provided to said thermal-fly-height-control element.

11. The method recited in claim 1, wherein said resolution is measured by T50.

12. The method recited in claim 11, wherein said criterion is that T50 is less than or equal to 28 nanometers.

13. The method recited in claim 1, further comprising a method for controlling proximity of said read element of said perpendicular-magnetic-recording head to said perpendicular-magnetic-recording disk without contacting said perpendicular-magnetic-recording disk.

14. A thermal-fly-height-control circuit configured to control proximity of a read element of a perpendicular-magnetic-recording head to a perpendicular-magnetic-recording disk, said thermal-fly-height-control circuit comprising:
  a thermal-fly-height-control-signal synthesizer configured to generate a thermal-fly-height-control signal associated with a resolution of a read-back signal having satisfied a criterion for said resolution of said read-back signal, wherein said resolution is measured by T50 obtained from said read-back signal of said recorded data written with a low-frequency, square-wave waveform; and
  a thermal-fly-height-control element electrically coupled to said thermal-fly-height-control-signal synthesizer and configured to be driven with said thermal-fly-height-control signal to position said read element of said perpendicular-magnetic-recording head in communication with said perpendicular-magnetic-recording disk for reading recorded data from said perpendicular-magnetic-recording disk, wherein said proximity of said read element is controlled by said resolution of said read-back signal having satisfied a criterion for said resolution of said read-back signal.

15. The thermal-fly-height-control circuit of claim 14, wherein said thermal-fly-height-control-signal synthesizer further comprises:
  a digital-signal processor programmed to generate a digital signal for synthesizing said thermal-fly-height-control signal;
  a digital-to-analog convertor electrically coupled to said digital-signal processor wherein said digital-to-analog convertor converts said digital signal into an analog signal; and
  a thermal-fly-height-control-element driver to amplify said analog signal to generate said thermal-fly-height-control signal.

16. The thermal-fly-height-control circuit of claim 14, wherein said criterion is that T50 is less than or equal to 28 nanometers.

17. The thermal-fly-height-control circuit of claim 14, wherein said proximity of said read element of said perpendicular-magnetic-recording head to said perpendicular-magnetic-recording disk is controlled without contacting said perpendicular-magnetic-recording disk.

18. A hard-disk drive configured to control proximity of a read element of a perpendicular-magnetic-recording head to a perpendicular-magnetic-recording disk, said hard-disk drive comprising:
  said perpendicular-magnetic-recording disk rotatably mounted on a spindle;
  a head-gimbal assembly comprising:
    said perpendicular-magnetic-recording head comprising:
      a write element for writing data to said perpendicular-magnetic-recording disk;
      said read element for reading data from said perpendicular-magnetic-recording disk; and
      a thermal-fly-height-control element configured to position said read element of said perpendicular-magnetic-recording head in communication with said perpendicular-magnetic-recording disk for reading recorded data from said perpendicular-magnetic-recording disk; and
    a lead suspension attached to said perpendicular-magnetic-recording head; and
    a load beam attached at a gimbal portion of said load beam to a slider including said perpendicular-magnetic-recording head; and
  a drive motor having a motor shaft attached to said spindle for rotating said perpendicular-magnetic-recording disk;

a voice-coil motor comprising:
- an armature including a voice-coil attached to said arm; and
- a stator including a voice-coil magnet;
- wherein said armature of said voice-coil motor is attached to said arm and is configured to move said head-arm assembly to access portions of said perpendicular-magnetic-recording disk; and a thermal-fly-height-control circuit comprising:
- a thermal-fly-height-control-signal synthesizer configured to generate a thermal-fly-height-control signal controlled by a resolution of a read-back signal having satisfied a criterion for said resolution of said read-back signal, wherein said resolution is measured by T50 obtained from said read-back signal of said recorded data written with a low-frequency, square-wave waveform; and
- said thermal-fly-height-control element electrically coupled to said thermal-fly-height-control-signal synthesizer.

19. The hard-disk drive of claim 18, wherein said thermal-fly-height-control-signal synthesizer further comprises:
- a digital-signal processor programmed to generate a digital signal for synthesizing said thermal-fly-height-control signal;
- a digital-to-analog convertor electrically coupled to said digital-signal processor wherein said digital-to-analog convertor converts said digital signal into an analog signal; and
- a thermal-fly-height-element driver to amplify said analog signal to generate said thermal-fly-height-control signal.

20. The hard-disk drive of claim 19, wherein said criterion is that T50 is less than or equal to 28 nanometers.

21. The hard-disk drive of claim 18, wherein said proximity of said read element of said perpendicular-magnetic-recording head to said perpendicular-magnetic-recording disk is controlled without contacting said perpendicular-magnetic-recording disk.

* * * * *